United States Patent
Morris et al.

(10) Patent No.: US 8,069,472 B2
(45) Date of Patent: ***Nov. 29, 2011

(54) METHODS, SYSTEMS, AND STORAGE MEDIUMS FOR IMPLEMENTING ISSUE NOTIFICATION AND RESOLUTION ACTIVITIES

(75) Inventors: Scott Morris, Atlanta, GA (US);
Stephen Cersosimo, Buforg, GA (US);
William Conner, Rosewell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/543,538

(22) Filed: Aug. 19, 2009

(65) Prior Publication Data

US 2009/0307754 A1    Dec. 10, 2009

Related U.S. Application Data

(63) Continuation of application No. 10/840,550, filed on May 6, 2004, now Pat. No. 7,587,753.

(51) Int. Cl.
*H04L 29/02* (2006.01)
(52) U.S. Cl. .................. 726/3; 726/23; 726/24
(58) Field of Classification Search .................. None
See application file for complete search history.

(56) References Cited

U.S. PATENT DOCUMENTS

| | | |
|---|---|---|
| 5,600,403 A | 2/1997 | Inoo |
| 5,638,448 A | 6/1997 | Nguyen |
| 5,719,941 A | 2/1998 | Swift et al. |
| 6,226,383 B1 | 5/2001 | Jablon |
| 6,405,318 B1 | 6/2002 | Rowland |
| 6,728,884 B1 | 4/2004 | Lim |
| 6,732,278 B2 | 5/2004 | Baird, III et al. |
| 6,801,900 B1 | 10/2004 | Lloyd |
| 6,848,997 B1 | 2/2005 | Hashimoto et al. |
| 6,912,568 B1 | 6/2005 | Nishiki et al. |
| 7,353,536 B1 | 4/2008 | Morris et al. |
| 2002/0171546 A1 | 11/2002 | Evans et al. |
| 2003/0004834 A1* | 1/2003 | Yamazaki ............. 705/26 |
| 2003/0046308 A1 | 3/2003 | Weber et al. |
| 2003/0138084 A1* | 7/2003 | Lynam et al. ........ 379/114.14 |
| 2004/0019528 A1 | 1/2004 | Broussard et al. |
| 2004/0062370 A1* | 4/2004 | O'Neal et al. ........ 379/112.01 |
| 2004/0095903 A1 | 5/2004 | Ryan et al. |
| 2007/0204033 A1* | 8/2007 | Bookbinder et al. ...... 709/224 |
| 2008/0120703 A1 | 5/2008 | Morris et al. |

(Continued)

OTHER PUBLICATIONS

Bielawski, et al.: Engineering Application Using COTS Components: An In-House Development Alternative: pp. 21-25.
Townsley, et al.; Memo from Network Working Group entitled "Layer Two Tunneling Protocol L2TP"; (Aug. 1999); pp. 1-72.

(Continued)

*Primary Examiner* — Minh Dinh
*Assistant Examiner* — Venkat Perungavoor
(74) *Attorney, Agent, or Firm* — Cantor Colburn LLP

(57) ABSTRACT

Exemplary embodiments include methods, systems, and storage mediums for implementing issue notification and resolution activities. A method includes receiving a request for access to a network service from an end user client system associated with an account. Upon determining an issue is associated with the account, the method includes flagging a user profile for the account to reflect the issue. Flagging accounts includes assigning a unique flag for each type of issue for determining a location for routing the request associated with flagged user profiles. The method also includes redirecting the request for access to a web server of the service provider network. Upon successful resolution of the issue, the method includes providing access to the network service for the end user client system.

20 Claims, 3 Drawing Sheets

OTHER PUBLICATIONS

Rigney, et al.; Memo from Network Working Group entitled "Radius Accounting"(Jun. 2000); pp. 1-25.

Rigney, et al.; Memo from Network Working Group entitled Remote Authentication Dial in User Service (Radius) (Jun. 2000); pp. 1-68.

* cited by examiner

METHODS, SYSTEMS, AND STORAGE MEDIUMS FOR IMPLEMENTING ISSUE NOTIFICATION AND RESOLUTION ACTIVITIES

CROSS-REFERENCE TO RELATED APPLICATIONS

This application is a continuation of U.S. patent application Ser. No. 10/840,550, filed May 6, 2004, the entire contents of which are incorporated herein by reference.

BACKGROUND OF INVENTION

The present invention generally relates to customer service processes, and more particularly, to methods, systems, and storage mediums for implementing issue notification and resolution activities.

Online service providers offer a variety of services to their customers including an opportunity to purchase or upgrade to new products and services, technical assistance in using or repairing these products and services, and account and billing assistance, to name a few. Most providers offer their customers the convenience of paying for their service online through the service providers' websites. When a customer is delinquent in paying for this service, however, the typical response of the service provider is to terminate the service until the customer pays the past due account. The next time the customer attempts to access the online service, the customer receives an error message such as "web page not available—try again later" or some similar type of message. The customer may or may not be aware of the billing delinquency, particularly if the error is on the service provider's side, and will need to contact the service provider by means other than the service that was terminated in order to rectify the issue and reinstate the service. This can be time-consuming, costly, and inconvenient to both the customer and the service provider, both of whom have an interest in keeping the service active. The same disadvantages may apply for online computer system customers who encounter technical problems such as a network virus that prevents access to a desired target website or causes the system to fail in accessing all of the service features provided by the service provider.

What is needed, therefore, is a way to notify the customer of an issue and provide an opportunity to resolve the issue without fully terminating access to the service.

SUMMARY OF INVENTION

Exemplary embodiments include methods, systems, and storage mediums for implementing issue notification and resolution activities. A method includes receiving a request for access to a network service from an end user client system associated with an account. Upon determining an issue is associated with the account, the method includes flagging a user profile for the account to reflect the issue. Flagging accounts includes assigning a unique flag for each type of issue for determining a location for routing the request associated with flagged user profiles. The method also includes redirecting the request for access to a web server of the service provider network. Upon successful resolution of the issue, the method includes providing access to the network service for the end user client system.

Systems for implementing issue notification and resolution activities are also provided. A system includes a logic network receiving a request for access to a network service from a user associated with an account. Upon determining an issue is associated with the account, a user profile of the account is flagged to reflect the issue. Flagging accounts includes assigning a unique flag for each type of issue for determining a location for routing the request. The logic network redirects the request for access to the determined location. The system also includes a reprovisioning network controlling access to the network service such that access to the network service by the user is deferred without terminating the account pending a resolution of the issue.

A storage medium for implementing issue notification and resolution activities is also provided. The storage medium includes instructions for causing a computer to implement a method. The method includes receiving a request for access to a network service from an end user client system associated with an account. Upon determining an issue is associated with the account, the method includes flagging a user profile for the account to reflect the issue. Flagging accounts includes assigning a unique flag for each type of issue for determining a location for routing the request associated with flagged user profiles. The method also includes redirecting the request for access to a web server of the service provider network. Upon successful resolution of the issue, the method includes providing access to the network service for the end user client system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION

The reprovisioning system of the invention enables a service user to resolve system issues without requiring intervention of a helpdesk, call center, or other service entity and without requiring termination of the user's service account. If the user is still unable to resolve the issue after exhausting the features offered by the reprovisioning system, the reprovisioning system provides the user with a unique phone number that will put the user in direct contact with a service specialist. The types of services provided to the user are typically Internet access and web services hosted by dial-up, DSL, cable, satellite, and/or wireless service providers.

Figure 1:
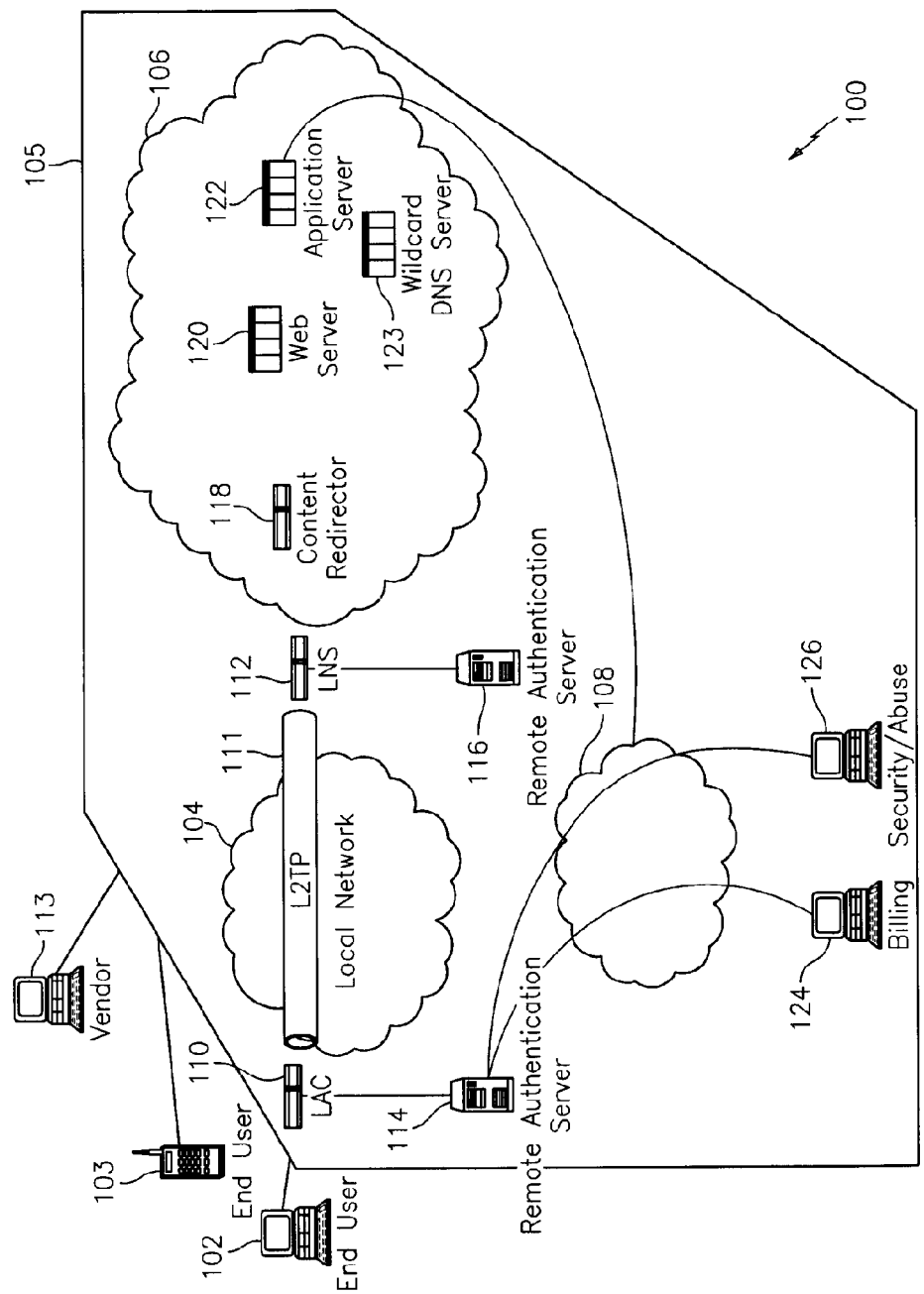
FIG. 1 is a block diagram of a network system upon which the reprovisioning system is implemented in exemplary embodiments.

Turning now to FIG. 1, a block diagram of a network system 100 upon which the reprovisioning system may be executed is shown. System 100 includes end user client systems 102 and 103 and a third-party vendor client system 113 (e.g., a vendor of virus correction services/software) in communication with a service provider 105 via service provider network 104. Service provider network 104 further includes two virtual networks, namely, a logic network 106 and reprovisioning network 108. Virtual networks 106 and 108, along with service provider network 104 may comprise a single network, however, virtual networks are logically addressable as distinct and independent networks as described further herein.

End user client system 102 refers to a computer device such as a general-purpose computer, personal computer or desktop, laptop, or similar device. End user client system 103 refers to a mobile communications device such as cellular telephone, personal digital assistant, wireless laptop, etc. End user client systems 102 and 103 are operated by customers of service provider 105 and receive Internet access or similar online services from service provider 105 typically under an agreement.

Vendor client system 113 refers to a business partner of service provider 105 that provides virus protection tools or system security services to customers either via direct download, disk, or other means. Third-party vendor client system 113 receives notifications from service provider 105 when a customer experiencing technical problems with service due to system abuse, such as a virus, worm, security breach/violation, system performance violation, or similar affliction has been identified.

Service provider 105 may comprise a telecommunications service provider, an Internet Service Provider (ISP), a cable service provider, an applications/web service provider, or similar entity. Service provider network 104 may also include layer two tunneling protocol (L2TP) access concentrator 110, L2TP server 111, and L2TP network server (LNS) 112. L2TP access concentrator (LAC) 110 refers to a node that forwards (tunnels) packets to L2TP server 111 from one of end user client systems 102 and 103. LAC 110 uses L2TP protocol as defined by the Internet Engineering Task Force (IETF), an organization that develops Internet protocols for standardizing communications. The L2TP protocol advances the utility of existing layer 2 point-to-point transport mechanisms (e.g., PPP) by allowing the L2 and PPP endpoints to reside on different devices that are interconnected by a packet-switched network. Thus, using L2TP, an L2 connection may be terminated at a local circuit concentrator rather than the network access server avoiding a potential long-distance charge.

L2TP server 111 resides within service provider network 104. L2TP server 111 refers to a network access server (NAS) that provides local network access to users of client systems 102 and 103 across a remote access network such as PSTN or a wireless network. LNS 112 is the peer node to the LAC 110 and refers to the endpoint of the L2TP tunnel. LNS 112 receives packets from LAC 110 via L2TP server 111.

LAC 110 also acts as a liaison between client systems 102, 103 and service provider network 104. Likewise, LNS 112 acts as a liaison between service provider network 104 and logical network 106 as will be described further herein.

It will be understood by those skilled in the art that the activities performed by LAC 110 and LNS 112 may be integrated into L2TP server 111 whereby server 111 comprises a single unit that provides these functions.

Remote authentication servers 114 and 116 perform access control and accounting activities for service provider network 104. Servers 114 and 116 may comprise high-speed processors for implementing these services on behalf of the service provider 105. In exemplary embodiments, servers 114 and 116 utilize remote authentication dial in user service (RADIUS) protocol for performing authentication, authorization, and accounting services. Remote authorization server 114 communicates with reprovisioning network 108 and service provider network 104. Remote authorization server 114 includes a database of user profiles for customers such as end users of client systems 102 and 103. Remote authentication server 114 authenticates the end users by validating the user account (e.g., where the account specifies the nature and extent of network services permitted) and by determining whether the user profile has been flagged as having an issue. This is described further herein. Remote authentication server 116 is in communication with service provider network 104 and logic network 106. Remote authentication server 116 validates user who have been tunneled through to logic network 106 as described further herein. The RADIUS protocol is defined in IETF Requests for Comments RFC 2138 and RFC 2139.

The service provider 105 further includes a logic network 106 that refers to a virtual network associated with provider network 104. Logic network 106 is responsible for attending to issues identified for a user's service, such as payment delinquency matters and system abuse issues such as virus infections, system violations and security breaches, and other similar matters.

Logic network 106 includes a content redirector 118, web server 120, application server 122, and domain name server (DNS) 123. Redirector 118 refers to a router that receives incoming packets from an end user 102, 103 (e.g., a request to access Internet services). Redirector 118 is instructed to redirect specified requests to alternate locations (e.g., any web requests and any connections on port 80 are to be redirected to a defined web portal, such as a portal of web server 120).

Web server 120 receives the redirected packets and, in turn, transmits a web page notifying the end user of the issue identified including any instructions on resolving the issue. For example, the instructions may include information on how to pay a delinquent bill, a link to a second web page of service provider 105 that provides additional direction, or may include a link to a third-party client system such as vendor client system 113. A sample computer screen window 300 illustrating a sample web page provided by web server 120 is provided in FIG. 3. The user may then select a link provided within the web page as directed. As indicated above, the link selected may result in a second web page being presented, such as for example, a customer billing web page that includes instructions and data fields for entering payment information.

Once the user satisfies the requirements set forth in the web page, applications server 122 provides this updated information to reprovisioning network 108. Any changes in the status of a user account are transmitted via applications server 122 to reprovisioning network 108. For example, if the issue addressed in the web page is not resolved, applications server 122 may update reprovisioning network 108, which in turn, manages the activation and/or termination of a user account. Applications server 122 may also track user-defined time limits for correcting an issue by comparing a date associated with the issue (e.g., when the issue was detected by the reprovisioning system or the date in which the user was notified of the issue, such as the date the user first attempts to gain access to a web site) with the current date in determining whether a pre-defined time limit for issue correction has been reached.

DNS server 123 is configured to respond to all user queries with a specified Internet Protocol (IP) address that is associated with logic network 106. For example, if a user enters a prohibited web site address into one of devices 102 or 103, DNS server 123 receives the address and alters it to specify logic network's 106 IP address. This ensures that the user is unable to gain access to alternate web resources other than those provided by logic network 106. A prohibited web site includes a web site which purpose is not directed to resolving the issue (e.g., www.cnn.com).

Reprovisioning network 108 refers to a virtual network that is logically addressable service provider network 104. Reprovisioning network 108 includes a billing client system 124 and a security/abuse client system 126 for managing customer accounts for users of client systems 102 and 103. If an issue relates to a delinquent customer account, for example, the billing client system 124 may receive instructions to defer future access to network services for the customer via the reprovisioning system. If the issue relates to security/abuse matters such as password issues, virus infections, or similar items, the security/abuse client system 126 may receive instructions to defer access to services for the affected customer client system. The process of initiating the deferral of access to network services is performed, in part, by flagging the user profile of the customer account as described further in FIG. 2.

While logic network 106 and reprovisioning network 108 are shown as separate networks, it will be understood that these networks 106 and 108 are likely to be integrated with service provider network 104. Networks 106 and 108 are logically addressable as distinct networks for purposes of managing customer service issues via the reprovisioning system.

Figure 2:
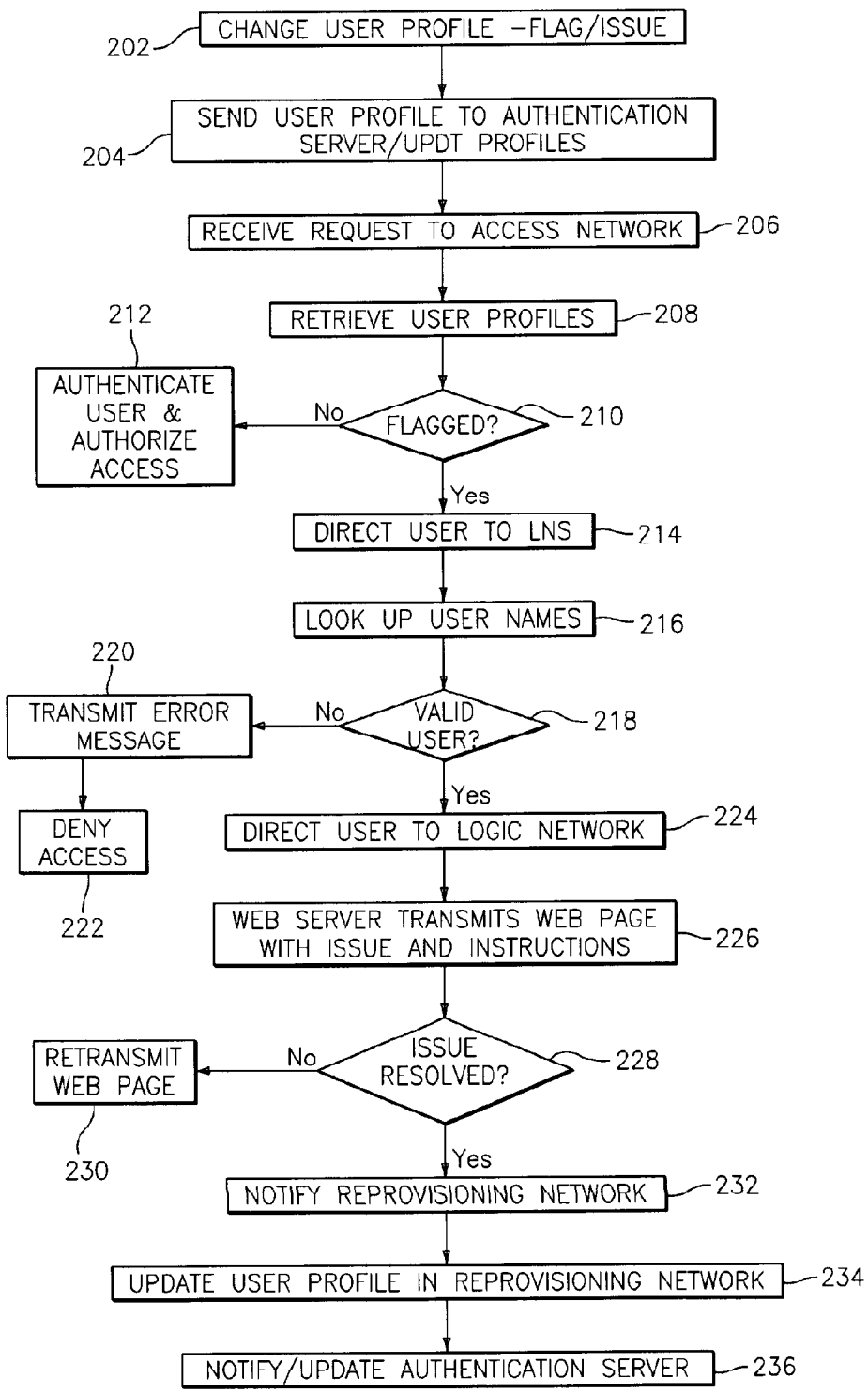
FIG. 2 is a flowchart describing a process for implementing the reprovisioning system in exemplary embodiments.

Turning now to FIG. 2, a process for implementing the reprovisioning system will now be described. The process presupposes that a customer issue regarding an end user client system 102 or 103 has been detected by service provider 105. At step 202, a user profile for the end user client system 102 or 103 is flagged and sent to remote authentication server 114. A unique flag may be utilized for each type of issue (e.g., billing payment delinquency, system abuse) detected to facilitate the routing of requests as described herein. Remote authentication server 114 updates a database of user profiles to include this information. The end user at one of client systems 102 or 103 attempts to access service provider network 104 at step 206. The request is received at remote authentication server 114, which in turn retrieves the database of user profiles in order to authenticate the end user at step 208. At step 210, remote authentication server checks the user profile to see if it has been flagged. If not, the end user is authenticated and granted access to the network. If, on the other hand, the user profile has been flagged at step 210, remote authentication server 114 directs LAC 110 to tunnel the request through network 104 to LNS 112 at step 214.

LNS 112 accesses remote authentication server 116 and performs a user name look up for the end user to determine the validity of the end user at step 216. If the user is not confirmed to be a valid user at step 218, server 116 transmits an error message to the user at step 220 and denies access to the network 104 at step 222. If confirmed at step 218, the request is transmitted to logical network 106 at step 224 where redirector 118 routes the request to the proper web portal at web server 120 in accordance with the type of issue flagged in the user profile. Web server 120 transmits a web page that notifies the end user of the issue detected and provides instructions on how to resolve the issue at step 226. The instructions may include information on how to pay a delinquent bill or may include a link to third-party client system such as vendor client system 113 where the issue flagged is a virus, worm, etc. In this manner, the user may have limited access to network services (i.e., the third-party client system web site). By limiting the user's access, the risks of spreading the virus or further infecting the user's system may be substantially decreased. For delinquent billing issues, the web page of FIG. 3 may be the only access to the network available to the user.

The end user may take immediate action to rectify the issue following the instructions provided on the web page. If the user does not take immediate action, service provider 105 may establish pre-defined business rules for addressing how long this inaction may continue before terminating the user account (e.g., a future request for access may result in no redirection to logic network 106 and no transmission of web page 300).

If the end user follows the instructions, the reprovisioning system initiates activity between application server 122, reprovisioning network 108, and associated entities such as remote authentication server 114 for updating the user profile and re-instituting full access permissions.

Figure 3:
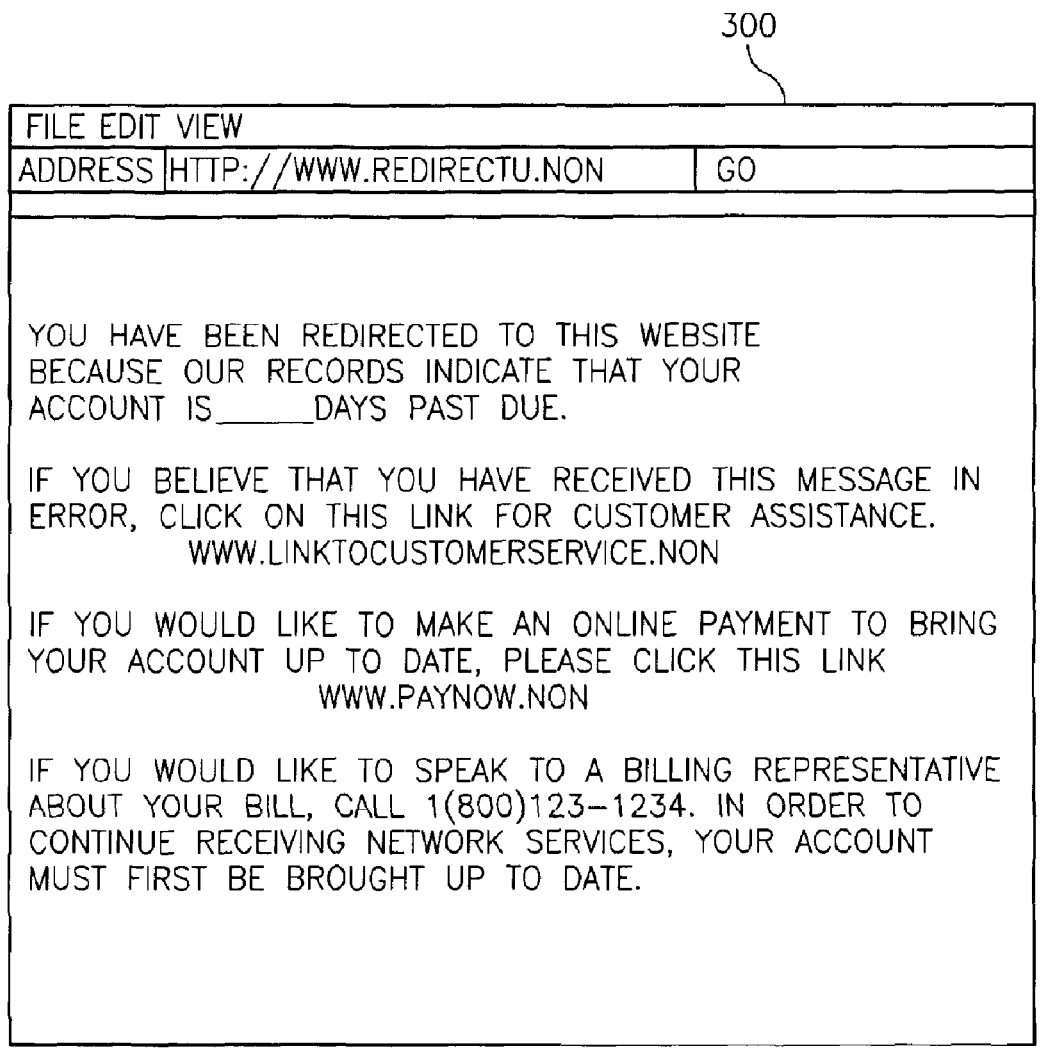
FIG. 3 is sample computer screen window illustrating a web page produced via the reprovisioning system as seen by an end user in exemplary embodiments.

At step 228, the reprovisioning system checks to see if the issue has been successfully resolved. If not, as indicated above, the end user may continue to receive the web page as shown in FIG. 3 at step 230. If the issue has been resolved, reprovisioning network 108 is notified via applications server 122 which, in turn, notifies remote authentication server 114 for updating the user profile and re-instituting access (steps 232-236).

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for implementing issue notification and resolution activities, comprising:
    receiving, via an authentication server of a service provider network, a request for access to a network service from an end user client system associated with an account;
    upon determining an issue is associated with the account, flagging a user profile for the account via the service provider network to reflect the issue, wherein flagging accounts includes assigning a unique flag for each type of issue, the unique flag operable for determining a location for routing the request associated with flagged user profiles;

redirecting the request for access, via a router of the service provider network, to a web server of the service provider network; and upon successful resolution of the issue, providing access, via the service provider network, to the network service for the end user client system.

2. The method of claim 1, wherein issues subject to the flagging include:
   a delinquent bill associated with the account; and
   a system abuse associated with the account, the system abuse comprising at least one of:
      a security violation associated with the account;
      a virus associated with the account; and
      a system violation associated with the account.

3. The method of claim 1, further comprising:
   transmitting, via the web server, notification of the issue and instructions for resolving the issue to the end user client system, the instructions including a time limit for rectifying the issue before terminating the account; and
   deferring access to the network service, via the service provider network, without terminating the account pending resolution of the issue.

4. The method of claim 3, wherein the time limit is determined by comparing a current date with one of a date when the issue is detected and a date in which the end user client system is notified of the issue, the user determined to have notice of the issue upon an attempt to gain access to a web site associated with the network service.

5. The method of claim 3, wherein the issue is directed to a delinquent bill associated with the account, and the instructions include directions on how to pay the delinquent bill.

6. The method of claim 1, wherein the location is a web portal.

7. The method of claim 1, further comprising:
   upon successful resolution of the issue, updating the user profile, via the authentication server, to reflect the successful resolution.

8. The method of claim 1, wherein redirecting the request includes:
   altering, via a domain name server of the service provider network, a web site address provided in the request to specify an alternate web site address that is operable for redirecting the request away from the web site address subject to the request;
   wherein the web site address subject to the request includes a web site which purpose is not directed to resolving the issue.

9. A system for implementing issue notification and resolution activities, comprising:
   a logic network receiving a request for access to a network service from a user associated with an account, wherein upon determining an issue is associated with the account, a user profile of the account is flagged to reflect the issue, wherein flagging accounts includes assigning a unique flag for each type of issue, the unique flag operable for determining a location for routing the request;
   the logic network redirecting the request for access to the determined location; and
   a reprovisioning network controlling access to the network service such that access to the network service by the user is deferred without terminating the account pending a resolution of the issue.

10. The system of claim 9, wherein the logic network includes a content redirector and a web server in communication with the content redirector, the content redirector redirecting the request for access to the web server, the web server representing the determined location.

11. The system of claim 10, wherein the logic network further includes a domain name server in communication with the content redirector, the domain name server responding to a request to access a prohibited web site by the user by altering a web site address provided in the request to specify an alternate web site address that is operable for redirecting the request away from the prohibited web site;
   wherein the prohibited web site includes a web site which purpose is not directed to resolving the issue.

12. The system of claim 10, wherein the web server includes at least one web portal, wherein redirecting the request for access to the web server includes assigning the request to the at least one web portal based upon the unique flag.

13. The system of claim 12, further comprising a web page associated with the web portal, the web page including instructions for resolving the issue.

14. The system of claim 12, further comprising a first web page associated with the web portal, the first web page including a link to a second web page;
   wherein the first web page is transmitted to an end user client system of the user in response to the request for access.

15. The system of claim 9, wherein issues subject to the flagging include:
   a delinquent bill associated with the account; and
   a system abuse associated with the account, the system abuse comprising at least one of:
      a security violation associated with the account;
      a virus associated with the account; and
      a system violation associated with the account.

16. The system of claim 9, wherein the logic network includes an applications server, the application server implementing:
   tracking a status of the account; and
   continuously apprising the reprovisioning network of the status.

17. A storage medium encoded with machine-readable computer program code for implementing issue notification and resolution activities, the computer program code comprising instructions, which when executed, cause a computer to implement:
   receiving a request for access to a network service from an end user client system associated with an account;
   upon determining an issue is associated with the account, flagging a user profile for the account to reflect the issue, wherein flagging accounts includes assigning a unique flag for each type of issue, the unique flag operable for determining a location for routing the request associated with flagged user profiles;
   redirecting the request for access to a web server of a service provider network implementing the issue notification and resolution activities; and
   upon successful resolution of the issue, providing the end user client system with access to the network service.

18. The storage medium of claim 17, further comprising instructions for:
   transmitting notification of the issue and instructions for resolving the issue to the end user client system, the instructions including a time limit for rectifying the issue before terminating the account; and
   deferring access to the network service without terminating the account pending resolution of the issue.

19. The storage medium of claim 18, wherein the time limit is determined by comparing a current date with one of a date when the issue is detected and a date in which the end user client system is notified of the issue, the user determined to have notice of the issue upon an attempt to gain access to a web site associated with the network service.

20. The storage medium of claim 17, wherein redirecting the request includes:

altering a web site address provided in the request to specify an alternate web site address that is operable for redirecting the request away from the web site address subject to the request;

wherein the web site address subject to the request includes a web site which purpose is not directed to resolving the issue.

* * * * *